Sept. 30, 1924.                    1,510,084
C. F. BRAINERD ET AL
PORTABLE POWER DRIVE
Filed Dec. 11, 1922        2 Sheets-Sheet 1

C. F. Brainerd
G. H. Toulson
INVENTORS

BY Victor J. Evans
ATTORNEY

WITNESS:

Sept. 30, 1924.  1,510,084
C. F. BRAINERD ET AL
PORTABLE POWER DRIVE
Filed Dec. 11, 1922   2 Sheets-Sheet 2
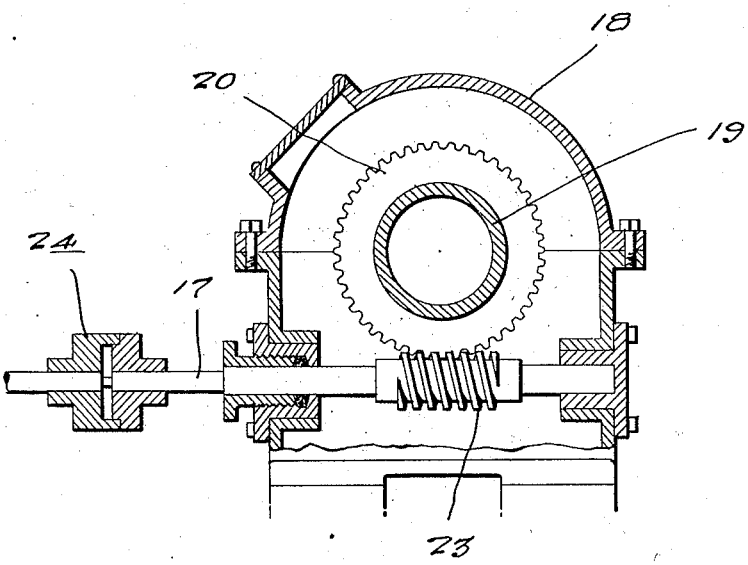
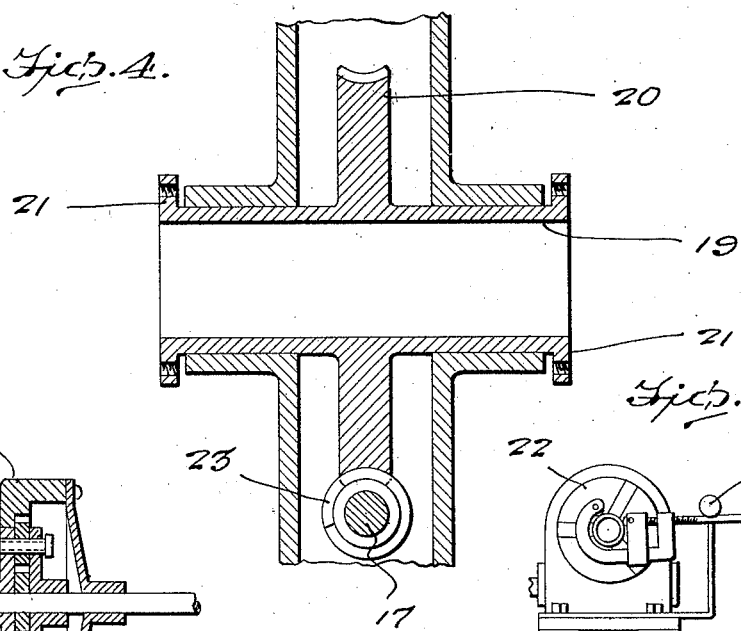
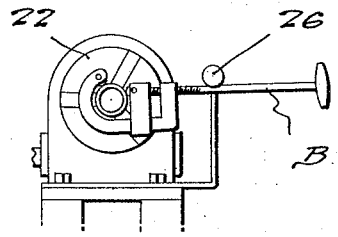
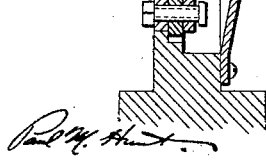
C. F. Brainerd
G. H. Toulson
INVENTORS
BY Victor J. Evans
ATTORNEY
WITNESS:

Patented Sept. 30, 1924.

1,510,084

UNITED STATES PATENT OFFICE.

CHARLES F. BRAINERD AND GEORGE H. TOULSON, OF ENDICOTT, NEW YORK.

PORTABLE POWER DRIVE.

Application filed December 11, 1922. Serial No. 606,262.

*To all whom it may concern:*

Be it known that we, CHARLES F. BRAINERD and GEORGE H. TOULSON, citizens of the United States, residing at Endicott, in the county of Broome and State of New York, have invented new and useful Improvements in Portable Power Drives, of which the following is a specification.

This invention relates to means for threading pipes, bolts and the like and for effecting cutting off thereof and has for its object the provision of a novel portable power drive which is mounted upon a wheeled truck whereby it may be readily transported from place to place wherever its use is needed instead of the work being brought to the device, the machine being provided with chuck means for holding the work and being so arranged that the dies or cutting off tool may be held stationary while the pipe, rod, bolt or the like is rotated, the advantage being that the operator will be relieved of the hard work involved in turning the dies or cutting tool as is necessary in the ordinary practice, the device being also advantageous for use in "making up" or assembling pipe sections and the like subsequent to their cutting, threading, or other treatment.

An important object is the provision of a device of this character which is so constructed that a right hand thread may be cut at one side of the device and a left hand thread at the other side.

Another object is the provision of a device of this character of such a nature that any ordinary or standard threading or cutting tools may be used in connection therewith.

An additional object is the provision of a machine for this purpose which will be simple and inexpensive in manufacture, highly efficient in use, durable in service and a general improvement in the art.

Figure 1:
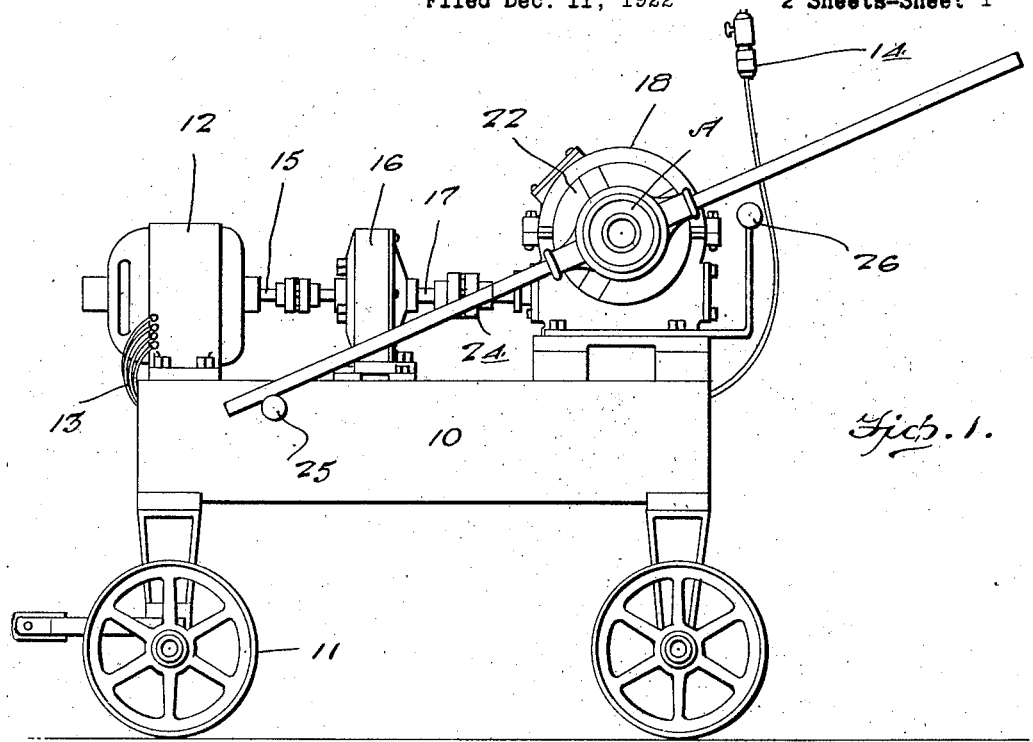
Figure 2:
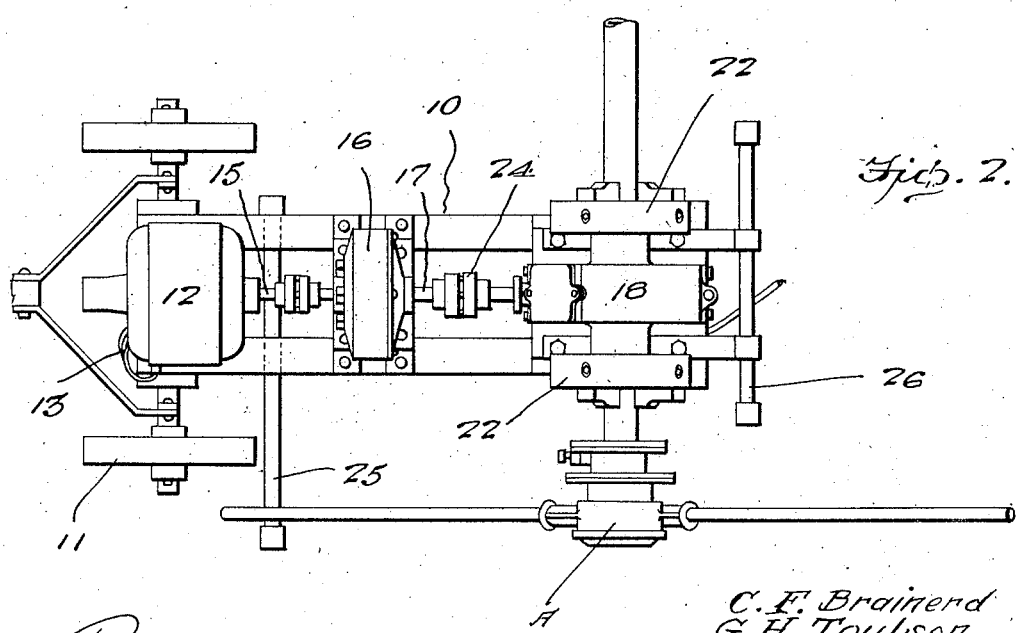

With the above and other objects and advantages in view the invention consists in the details of construction to be hereinafter more fully described and claimed and illustrated in the accompanying drawings, in which:

Figure 1 is a side elevation of the device,
Figure 2 is a top plan view thereof,
Figure 3 is a longitudinal section,
Figure 4 is a section taken along the shaft of the driven apparatus and
The remaining figures are detail views.

Referring more particularly to the drawings the numeral 10 designates a suitable supporting frame which is mounted upon a wheeled truck 11 so as to be readily portable.

Mounted upon one end of this truck is an electric motor 12 of any preferred type and horse power having its leads 13 connected with a suitable plug 14 which may be connected in an electric light socket for securing the proper power. The shaft 15 of the motor extends into a spur gear speed reducing device indicated at 16 from which leads a shaft 17 which extends into a casing 18 mounted upon the other end of the frame. Journaled through this casing is a hollow shaft 19 cast integrally with a worm gear 20 provided at both ends with flanges 21 to which are secured centering chucks 22 which are for the purpose of holding whatever object is to be rotated for the purpose of threading or cutting the same. The shaft 17 carries a worm 23 meshing with the worm wheel 30. If preferred a flexible coupling 24 may be interposed in the shaft 17.

In the use of the device the pipe, rod, bolt or the like to be threaded is gripped within either desired one of the chucks 22 while the die tool A is held stationary by the operator at the end of the article. When the motor is then set in operation it is apparent that power will be applied for rotating the chuck holding the object so that the object will be moved with respect to the die tool instead of vice versa as is ordinarily the case. Projecting from opposite sides of the truck frame 10 are stops 25 against which the handle of the die tool will engage so as to relieve the operator of the strain of holding it after threading has been started. It is obvious that at one side of the machine a right hand thread may be cut and at the opposite side a left hand thread may be cut.

In order to cut off a pipe, rod, bolt or the like, it is engaged within either one of the chucks 22 and turned in the same manner while the cutting tool B is engaged upon the object at the proper point. Carried by the base which supports the casing 18 is a stop 26 against which the cutting tool B engages for holding it in position without it being held by the operator. In this way it will be seen that the operator is put to no labor at all other than the effort involved in starting threading and turning the blade moving handle of the cutter from time to time.

From the foregoing description and a study of the drawings it is apparent that we have thus provided a simply constructed and consequently inexpensive portable device which may be readily wheeled from place to place wherever its use is desired and which will quickly and easily operate to effect threading or cutting of objects in a very efficient manner. Owing to the strength of the parts and their fewness it is apparent that there is little to get out of order so that the machine should have a long life and satisfactorily perform all of its functions.

While we have shown and described the preferred embodiment of the invention it is of course to be understood that we reserve the right to make such changes in the form, construction and arrangement of parts as will not depart from the spirit of the invention or the scope of the subjoined claims.

We claim:

1. A device of the character described comprising a wheeled truck, a motor mounted thereon, a casing having a suitable base mounted upon the truck, a hollow shaft journaled through said casing and carrying a worm wheel, a worm meshing with said worm wheel carried by a shaft driven from said motor, chucks mounted upon opposite ends of said hollow shaft, and stop members slidable across the truck and selectively extensible.

2. A device of the character described comprising a wheeled truck, a motor mounted thereon, a casing having a base mounted upon the truck, a hollow shaft journaled through said casing and carrying a worm wheel, a worm meshing with said worm wheel carried by a shaft driven from said motor, chucks mounted upon opposite ends of said hollow shaft, slidably mounted stops projecting outwardly from the truck and other slidably mounted stops carried by the base of said casing, either of said stops being extensible into position for engagement by the handle of a cutting tool for holding the same stationary.

3. In a device of the character described, a support, a motor driven shaft mounted thereon and carrying chucks adapted to hold an element to be cut, a cutting tool having a handle, and a pair of rods slidable across the support at opposite sides of the shaft, either rod being adapted to have either end extended into position for engagement by the handle of the cutting tool whereby to act as a stop for holding the tool stationary.

In testimony whereof we affix our signatures.

CHARLES F. BRAINERD.
GEORGE H. TOULSON.